(12) United States Patent
Saas et al.

(10) Patent No.: US 9,489,118 B2
(45) Date of Patent: Nov. 8, 2016

(54) DRAG AND DROP OPERATION IN A GRAPHICAL USER INTERFACE WITH SIZE ALTERATION OF THE DRAGGED OBJECT

(71) Applicant: France Telecom, Paris (FR)

(72) Inventors: Alain Saas, Selestat (FR); Hyacinthe Briand, San Francisco, CA (US)

(73) Assignee: FRANCE TELECOM, Paris (FR)

( * ) Notice: Subject to any disclaimer, the term of this patent is extended or adjusted under 35 U.S.C. 154(b) by 299 days.

(21) Appl. No.: 13/729,612

(22) Filed: Dec. 28, 2012

(65) Prior Publication Data

US 2013/0275901 A1 Oct. 17, 2013

Related U.S. Application Data

(60) Provisional application No. 61/581,570, filed on Dec. 29, 2011.

(51) Int. Cl.
*G06F 3/0486* (2013.01)
*G06F 3/048* (2013.01)
*G06F 3/0481* (2013.01)

(52) U.S. Cl.
CPC ......... *G06F 3/0486* (2013.01); *G06F 3/04817* (2013.01); *G06F 2203/04806* (2013.01)

(58) Field of Classification Search
CPC ............. G06F 3/04817; G06F 3/0486; G06F 2203/04806
USPC .......................................................... 715/769
See application file for complete search history.

(56) References Cited

U.S. PATENT DOCUMENTS

| | | | |
|---|---|---|---|
| 5,754,178 A * | 5/1998 | Johnston et al. | 715/769 |
| 5,835,094 A * | 11/1998 | Ermel et al. | 715/848 |
| 6,976,224 B2 | 12/2005 | Nii | |
| 7,576,756 B1 * | 8/2009 | Good | G06F 3/0481 345/635 |
| 2007/0016872 A1 * | 1/2007 | Cummins et al. | 715/769 |
| 2007/0209022 A1 * | 9/2007 | Gourdol et al. | 715/815 |
| 2007/0234226 A1 * | 10/2007 | Szeto | 715/769 |
| 2008/0235602 A1 * | 9/2008 | Strauss et al. | 715/762 |
| 2008/0307351 A1 * | 12/2008 | Louch et al. | 715/782 |
| 2009/0113330 A1 * | 4/2009 | Garrison et al. | 715/769 |
| 2009/0276701 A1 * | 11/2009 | Nurmi | 715/702 |
| 2010/0146425 A1 | 6/2010 | Lance et al. | |
| 2010/0241979 A1 * | 9/2010 | Apted | 715/765 |
| 2011/0010645 A1 * | 1/2011 | Mihalcea | 715/762 |
| 2011/0072375 A1 * | 3/2011 | Victor | 715/765 |
| 2011/0138324 A1 * | 6/2011 | Sweeney et al. | 715/800 |
| 2013/0120439 A1 * | 5/2013 | Harris et al. | 345/619 |

OTHER PUBLICATIONS

European Search Report and Written Opinion dated Jun. 21, 2013 for corresponding European Patent Application No. 12306565, 8 pages.

* cited by examiner

*Primary Examiner* — Amy M Levy
(74) *Attorney, Agent, or Firm* — David D. Brush; Westman Champlin & Koehler, P.A.

(57) ABSTRACT

A method and device are provided for enabling drag and drop targets of a first object onto one of a plurality of second objects in a graphical user interface (GUI), each object being characterized by a respective size. The method includes receiving a drag input on the first object, determining one or more second objects onto which the first object may is likely to be dropped using at least the received drag input, and altering the size of the first object based on the determined one or more second objects respective sizes.

11 Claims, 11 Drawing Sheets

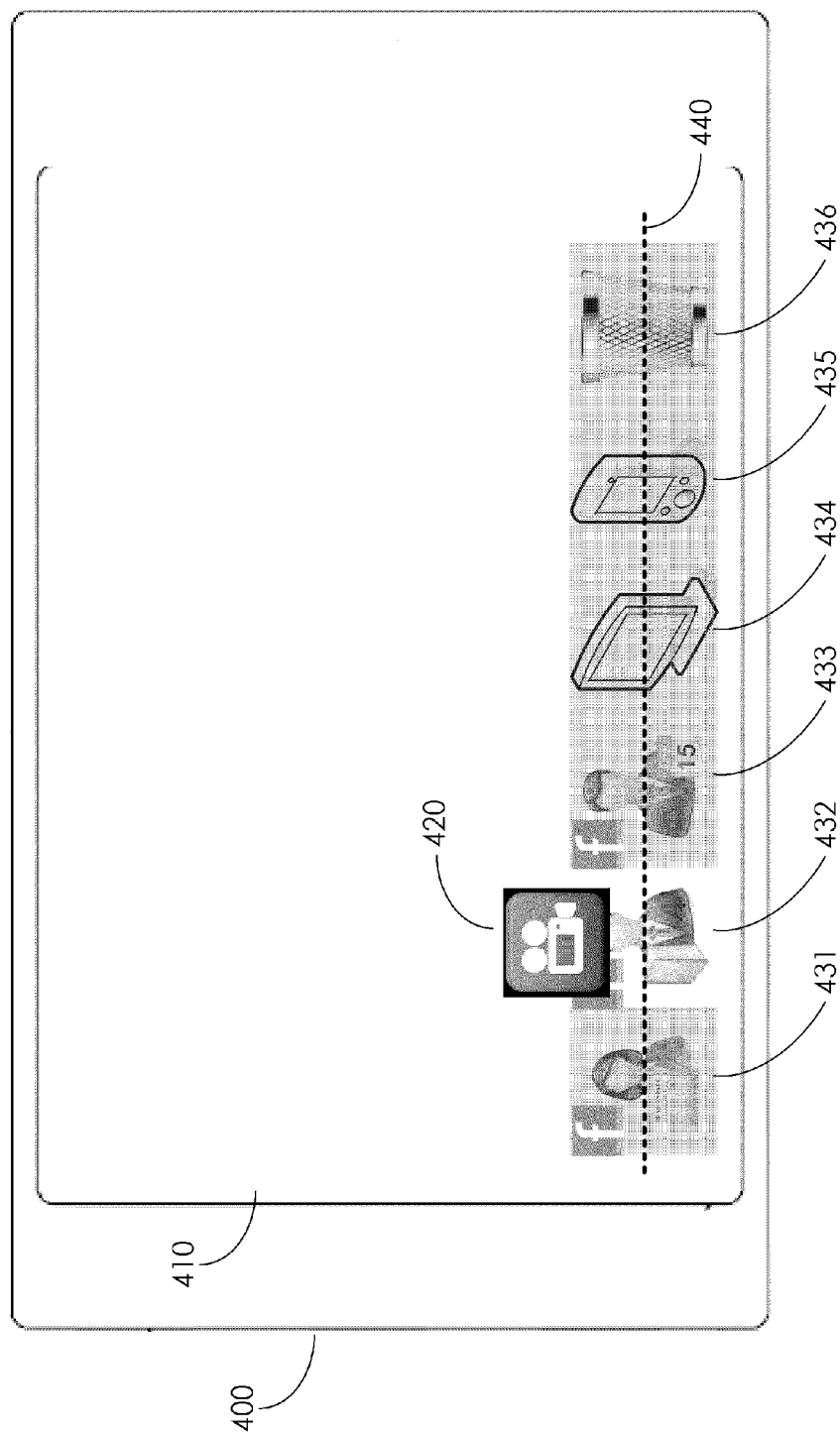

DRAG AND DROP OPERATION IN A GRAPHICAL USER INTERFACE WITH SIZE ALTERATION OF THE DRAGGED OBJECT

CROSS-REFERENCE TO RELATED APPLICATION

The present application is based on and claims the benefit of U.S. provisional patent application No. 61/581,570, filed Dec. 29, 2011, the content of which is hereby incorporated by reference in its entirety.

FIELD OF THE PRESENT SYSTEM

The present system generally relates to electronic devices such as mobile devices or computers, and more specifically to drag and drop operations.

BACKGROUND OF THE PRESENT SYSTEM

Like copy-past or point-and-click, drag-an-drop has been a major feature for computer graphical user interfaces along with the commoditization of mouse devices. It may be used for moving/copying files to a new location (such as a folder). The icon representing a file can be dragged (through e.g. a select and hold user input) across a Graphical User Interface (GUI) to be dropped on a recipient or target icon, for instance representing a file directory. Another use case is when user is looking for deleting a file: its icon may be dropped to a trashcan icon to delete it. Such implementations can be seen on Windows™ Operating System (OS) 3.1 and further Windows™ versions. Overall, drag-and-drop corresponds to the action of moving a virtual object into another window or onto another virtual object.

The rise of connected screens and over-the-top media services creates new challenges for the drag-and-drop operation. First—on usage, the plurality of media that can be shared between devices is following an asymptotic curve making the drag-and-drop operation all the more significant. Second—on context of usage, the proliferation of small touch screens combined to bigger (in size) user input (thumb instead of pointer) are making the drag-and-drop more difficult that it used to be.

The multiplicity of home devices for a same users also require novel sharing solutions. It is common now to start consuming media content on a first user device and, once satisfied with a selection, to transfer it on to a second user device. Such a transfer may be enabled through a drag and drop operation.

A problem arises when the selected media content is currently being viewed by the user through a GUI displayed on his user or electronic device. It would be indeed interesting to drag and drop the media content directly onto a graphical object representing the second user device. There is nonetheless and most generally a difference in size between the first graphical object showing the media content and the second graphical object, onto which the media content may be dropped. In other words, target objects for a drop in today's GUIs are often smaller than a dragged object if the later is a displayed media content. With multiple target objects on a constrained display like the ones of a smartphone, it can become cumbersome for the user to perform the drag and drop operation in good conditions.

Therefore there is still a need for improved drag and drop techniques that can be readily applied to electronic devices such as smartphones or tablets. There is a further need for helping and guiding the user as he performs a drag and drop operation on such a small display.

SUMMARY OF THE PRESENT SYSTEM

An exemplary embodiment of the present system relates to a method of enabling the drag and drop of a first object onto one of a plurality of second objects in a graphical user interface (GUI), each object being characterized by a respective size, the method comprising:
- receiving a drag input on the first object,
- determining one or more second objects onto which the first object may is likely to be dropped using at least the received drag input,
- altering the size of the first object based on the determined one or more second objects respective sizes.

Thanks to the present method, the user has the impression that as he drags the first object of a first size closer to a targeted second object, its size will change to a size more compatible with the size of the targeted second object. This is all the more helpful in a constrained interface with a plurality of second objects are potential targets for the drop.

The present system also relates to an electronic device comprising:
- a display device for rendering a graphical user interface (GUI) comprising a first object and a plurality of second objects,
- a processor for enabling a drag and drop of the first object onto one of the plurality of second objects, the processor being further operable to:
  - receive a drag input on the first object,
  - determine one or more second objects onto which the first object is likely to be dropped using at least the received drag input,
  - alter the size of the first object based on the determined one or more second objects respective sizes.

The present system also relates to an application program embodied on a non transitory computer readable medium and executable by a computer to implement a method of enabling the drag and drop targets of a first object onto one of a plurality of second objects in a graphical user interface (GUI), each object being characterized by a respective size, the application program comprising instructions for:
- receiving a drag input on the first object,
- determining one or more second objects onto which the first object is likely to be dropped using at least the received drag input,
- altering the size of the first object based on the determined one or more second objects respective sizes.

BRIEF DESCRIPTION OF THE DRAWINGS

The present system is explained in further detail, and by way of example, with reference to the accompanying drawings wherein:

FIG. 4F shows an exemplary illustration of a GUI according to an additional embodiment of the present system.

DETAILED DESCRIPTION OF THE PRESENT SYSTEM

Figure 1:
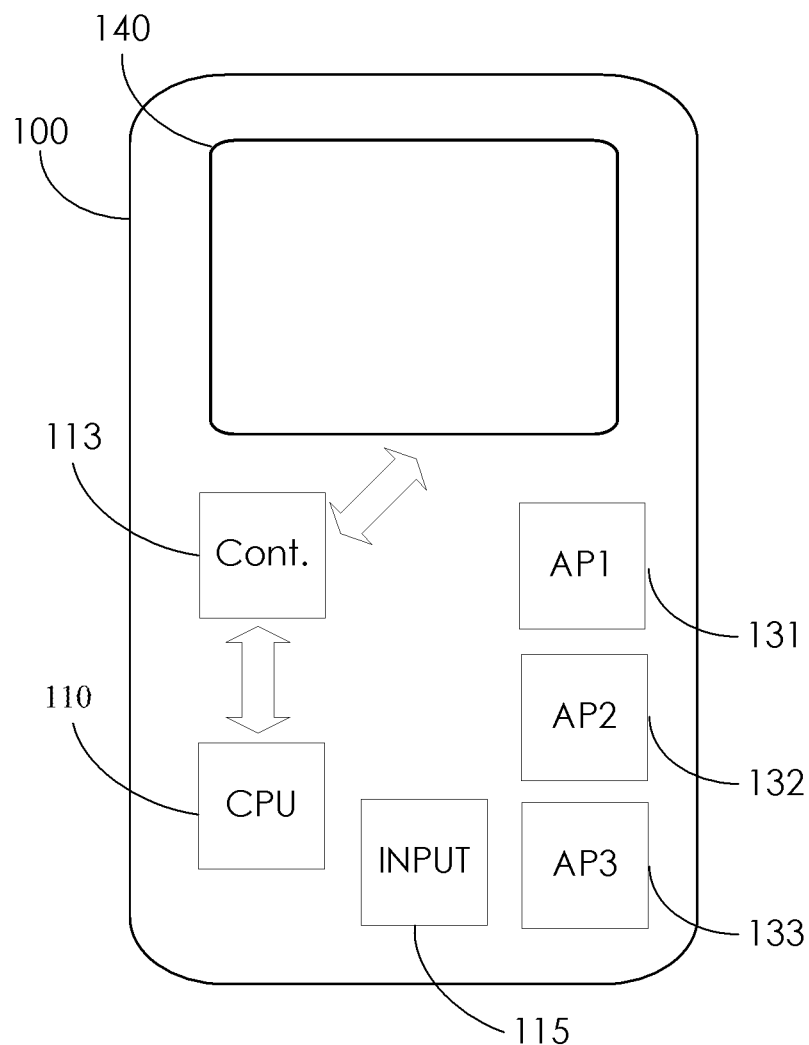
FIG. 1 shows a mobile device in accordance with an embodiment of the present system.

The following are descriptions of illustrative embodiments that when taken in conjunction with the following drawings will demonstrate the above noted features and advantages, as well as further ones. In the following description, for purposes of explanation rather than limitation, illustrative details are set forth such as architecture, interfaces, techniques, element attributes, etc. However, it will be apparent to those of ordinary skill in the art that other embodiments that depart from these details would still be understood to be within the scope of the appended claims. Moreover, for the purpose of clarity, detailed descriptions of well known devices, circuits, tools, techniques and methods are omitted so as not to obscure the description of the present system. It should be expressly understood that the drawings are included for illustrative purposes and do not represent the scope of the present system. In the accompanying drawings, like reference numbers in different drawings may designate similar elements.

For purposes of simplifying a description of the present system, the terms "operatively coupled", "coupled" and formatives thereof as utilized herein refer to a connection between devices and/or portions thereof that enables operation in accordance with the present system. For example, an operative coupling may include one or more of a wired connection and/or a wireless connection between two or more devices that enables a one and/or two-way communication path between the devices and/or portions thereof. An operative coupling may also include a wired and/or wireless coupling to enable communication between a media content platform, such as the media content serving a user device in accordance with an embodiment of the present system, and one or more user devices. An operative coupling may also relate to an interaction between program portions and thereby may not describe a physical connection so much as an interaction based coupling.

The term rendering and formatives thereof as utilized herein refer to providing content, such as digital media or a graphical user interface (GUI), such that it may be perceived by at least one user sense, such as a sense of sight and/or a sense of hearing. For example, the present system may render a user interface on a display device of an electronic or user device so that it may be seen and interacted with by a user. The term rendering may also comprise all the actions required to generate a GUI prior to the display, like e.g. a map representation generated on a server side for a browser application on a user device.

In accordance with an embodiment of the present system, an electronic device provides a GUI for controlling an application program (AP) through user inputs such as touch inputs. An application program (AP)- or software—may be seen as any tool that functions and is operated by means of a computer, with the purpose of performing one or more functions or tasks for a user or another application program.

To interact with and control an AP, a GUI of the AP may be displayed on the user device display.

Such a graphical user interface (GUI) may be provided in accordance with an embodiment of the present system:

by an application program running locally on a device processor (a device based—or resident—application), such as part of a computer system of the mobile device, and/or, as provided by a network connected device or web based server, such as a media content server providing media content to the user device, the GUI being rendered on user device through a local application program connected to the media content server (commonly called a web based application or web application in short).

For instance, the present GUI enabling a drag and drop operation (as explained later on) may be generated locally by a device based application or rendered by a local AP connected to a server providing the GUI elements. The present GUI may also be part of the GUIs proposed by the device OS. The provided visual environment may be displayed by the processor on a display device of the user device, for instance a touch sensitive panel (touch panel in short), which a user may use to provide a number of touch inputs of different types.

A GUI is a type of user interface which allows a user to interact with electronic devices such as computers, hand-held devices such as smartphones or tablets, household appliances, office equipment and the likes. GUIs are typically used to render visual and textual images which describe various visual metaphors of an operating system, an application, etc., and implemented on a processor/computer including rendering on a display device. Furthermore, GUIs can represent programs, files and operational functions with graphical images, objects, or vector representations. The graphical images can include windows, fields, dialog boxes, menus, icons, buttons, cursors, scroll bars, maps, etc. Such images can be arranged in predefined layouts, or can be created dynamically (by the device itself or by a web-based server as mentioned before) to serve the specific actions being taken by a user. In general, the user can select and/or activate various graphical images in order to initiate functions and tasks, i.e. controls, associated therewith. By way of example, a user can select a button that opens, closes, minimizes, or maximizes a window, a virtual representation or an icon that launches a particular application program. By way of another example, the GUI may present a typical user interface including a windowing environment and as such, may include menu items, pull-down menu items, icons, pop-up windows, etc., that are typical of those provided in a windowing environment, such as may be represented within a Windows™ Operating System GUI as provided by Microsoft Corporation and/or an OS X™ Operating System GUI, such as provided on an iPhone™, MacBook™, iMac™, etc., as provided by Apple, Inc., and/or another operating system.

FIG. 1 is an illustration of an exemplary user device 100 used in the present system. In the here after description, the user or electronic device will be illustrated as a mobile device 100, such as a smartphone or a tablet, with a touch panel. This illustration is in no way limiting as the present teaching would work for any electronic devices such as laptops, desktops and the likes, using user input provided for instance with a mouse. The mobile device 100 comprises a display device 140, a processor 110, a controller 113 of the display device, and an input device 115.

In the present system, the user interaction with and manipulation of the application program rendered on a GUI may be achieved using the display device 140, or screen, which might be e.g. a touch panel operationally coupled to the processor 112 controlling the displayed interface.

Processor 110 may control the rendering and/or the display of the GUI on the display device 140 depending on the type of application program, i.e. resident or web-based. Processor 110 may also handle the user entries or inputs according to the present method. The user entries to interact with an application program may be provided through interactions with the touch panel 140.

The touch panel 140 can be seen as an input device allowing interactions with a finger of a user or other devices such as a stylus. Touch sensor interface or touch panel 140 may include any suitable circuitry to convert analog signals corresponding to touch input received over its surface into any suitable digital touch input data. Such touch input data can, for example, be used to make selections of portions of the GUI of an AP or displace windows and graphical objects as explained here after. The input received from a user's touch input is sent to the processor 110. The touch panel 140 is configured to detect and report the (location of the) touch inputs to the processor 110, which can interpret these touches in accordance with the application program and the currently displayed GUI. For example, the processor 110 can initiate a task, e.g. a control of the AP or sent an activation message to a distance media server (not shown in FIG. 1) that a media content is to be streamed to and displayed on the display device 140, subsequent to a given touch input. The processor may also enable a drag and drop operation according to the present system.

The controller 113, e.g. a dedicated processor, may be provided to process input touches locally and reduce demand for the main processor 110 of the mobile device. The touch panel 140 can be based on sensing technologies including but not limited to capacitive sensing, resistive sensing, surface acoustic wave sensing, pressure sensing, optical sensing, and/or the likes. Here after, for simplification purpose, reference will be made to a finger of the user touching panel 140, other devices such as a stylus may be used in place of the user finger. An additional input device 115 may be provided to further interact with a GUI rendered on the display device 140. This may be the case for instance when using an electronic device such as a laptop or desktop, wherein the input device 115 is a mouse.

In the present system, the drag and drop operation may be performed using graphical objects of the OS GUI (like the GUI of an Android™ smartphone presenting AP icons that can be dragged and dropped onto different folder icons). Alternatively, a number of different applications may be provided with the mobile device 100, like AP1 131, AP2 132 and AP3 133 presenting GUIs such as the ones presented in FIGS. 4A to 4G, wherein a user can drag and drop a first object 420 onto a plurality of second objects 431 to 436. As mentioned before, such APs may be resident or web based.

Figure 2:
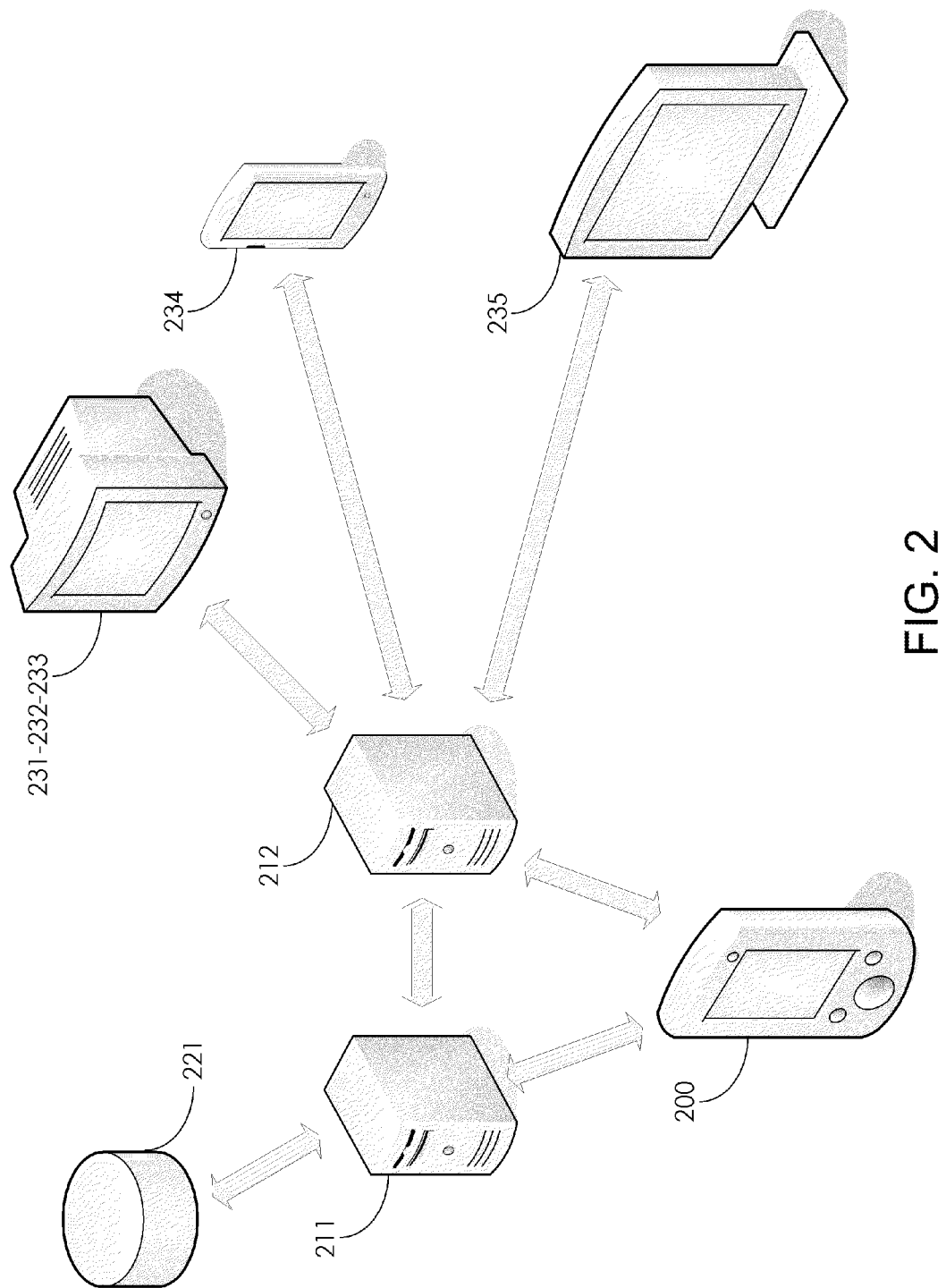
FIG. 2 shows an illustration of a first embodiment of the present system.

An example of the environment of a web based application is illustrated in FIG. 2. A mobile device 200 is configured for transferring a media content currently rendered or experienced on its display device. The content may be browsed from a media content server 211 that distributes media content from one or more media content libraries or database 221. The browsing may be enabled in a web browser or through a web application like one of the APs 131 to 133 mentioned here before.

Figure 4A:
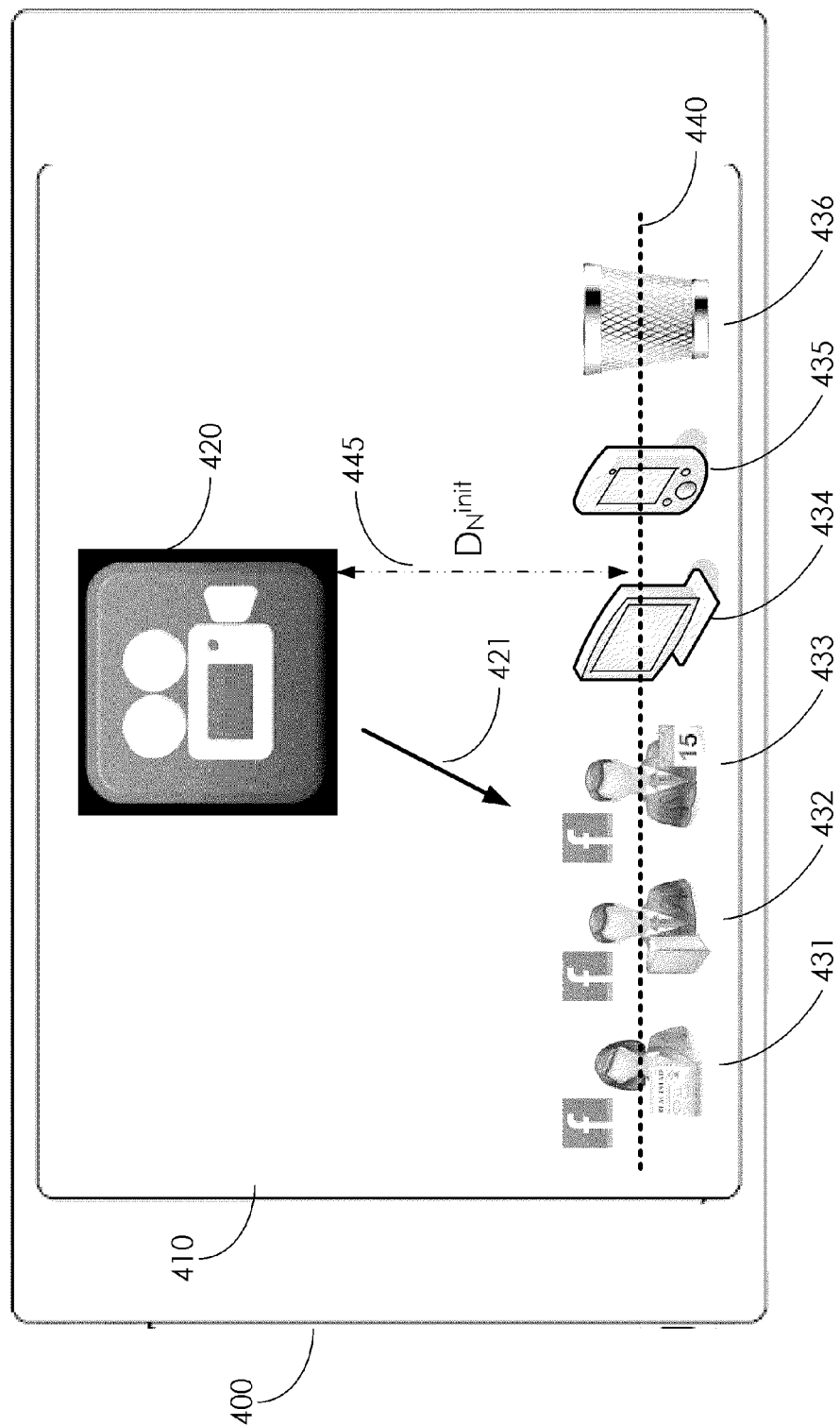
FIG. 4A shows an exemplary illustration of a GUI according to an additional embodiment of the present system.

An interface may allow the user to list different media contents from the media content database 211 available for viewing (if video content) or listening (if music). Once a user has selected a media content 420, illustrated in FIG. 4A with a media object or icon of a first size, he may want to share it with either friends on a social network or other devices operatively connected to his electronic device 200. To do so, a media transfer AP proposes a GUI as seen in FIGS. 4A to 4G, with a number of second (graphical) objects 431 to 436 representing different recipients such as friends on a social network (431 to 433), other devices (434, 435) or a trashcan to discard the media content 420. The second graphical objects are themselves characterized by their own dimensions or sizes. They may be of the same size as seen in FIGS. 4A to 4F, or of different sizes as seen in FIG. 4G.

Thanks to a drag and drop operation according to the present method, the user can drag music icon 420 to one of the second objects 431 to 436. The dropping on one of the second icon will cause the transfer AP to send an activation message for sharing the media content associated to the media icon with the recipient behind the chosen second icon. Illustrating the present drag and drop operation with the sharing of media content is a mere illustration, and other drag and drop operations, for instance for transferring or sorting out files, will benefit from the present teachings.

Going back to FIG. 2, the friend icons or objects 431 to 433 of FIGS. 4A to 4F correspond to other users connected through a social network behind an electronic device 231, 232 or 233 respectively. The other devices icons or objects 434 and 435 correspond respectively to other electronic devices 234 and 235 as illustrated in FIG. 2 with a tablet 234 and a flat screen 235. These different recipients of FIG. 2 may be registered with the transfer AP, thereby allowing to user to share the media content 420 with any one of them. A further trashcan object is available on the GUI of FIG. 4A, for instance for drag and dropping unwanted files.

Figure 3A:
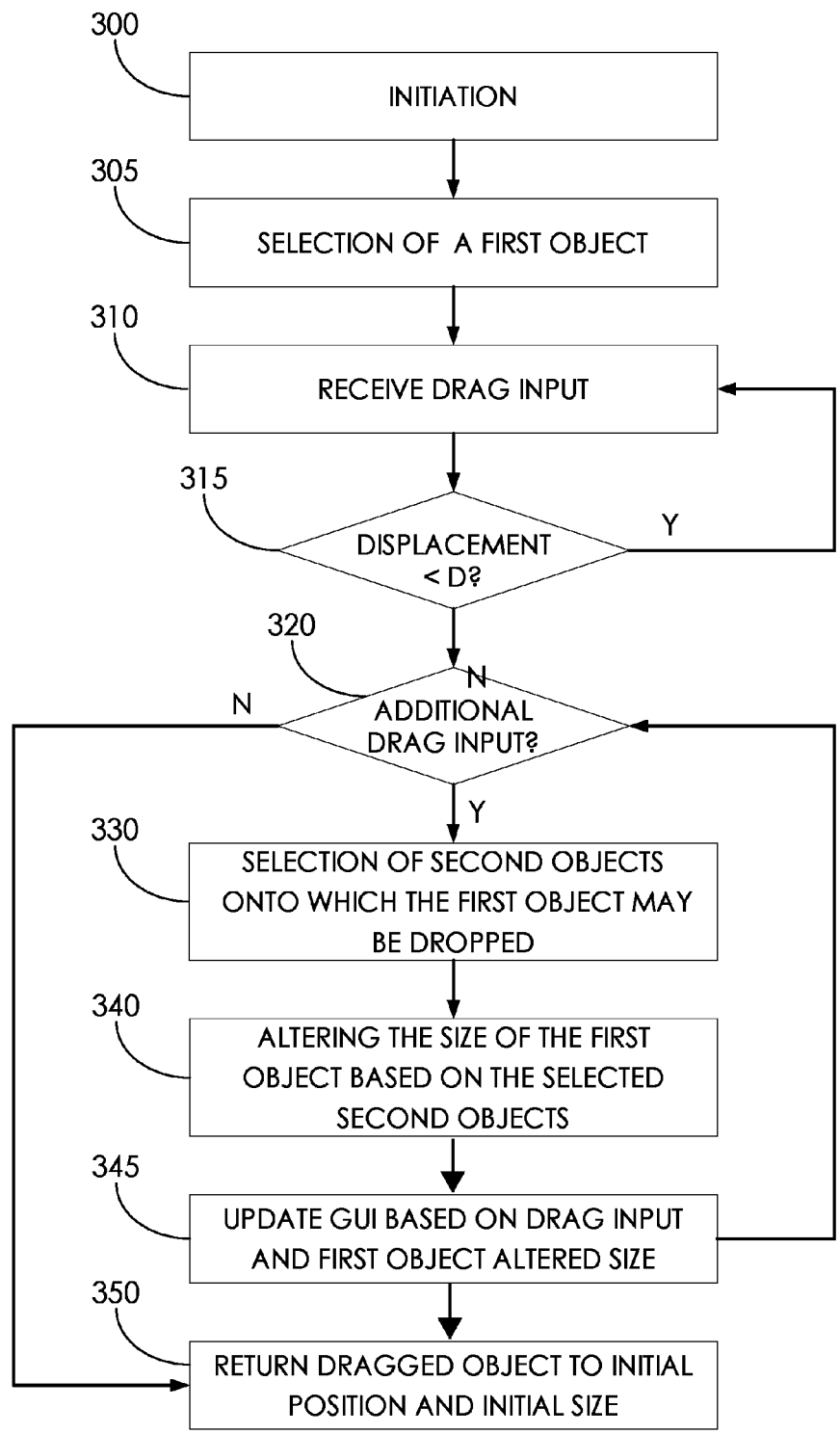
FIG. 3A is a flowchart illustrating an exemplary embodiment of the present method.

FIG. 3A is a flowchart illustrating an exemplary embodiment of the present method. Flowchart in FIG. 3A will be described in relation with the GUI examples of FIGS. 4A to 4F showing a drag and drop operation according to the present method.

In an initiation act 300, the user may launch the transfer AP and select a media content to share. As a result, a GUI of the transfer AP, as illustrated in FIG. 4A, may appear on the display device (or screen) 410 of his electronic device 400. The GUI may comprise as mentioned before a first (graphical) object 420, illustrated as a media icon of a first size. The GUI is arranged to enable a drag and drop operation (through a continuous user input, e.g. a continuous touch or mouse input) or mode between the first object 420 and one of a plurality of second (graphical) objects 431 to 436.

To do so, each time the user will provide a drag input on first object 420, the GUI will be updated by the processor of device 400 (referred to here after as the drag and drop loop or mode). Indeed the GUI will present a new position for the first object 420, according to the drag input received from the user. The drag input can be seen as a user input for displacing the first object. It may be for instance the sliding of a finger or a stylus on the touch panel of the electronic device 400, or the sliding of the pointer driven by a mouse as in know Windows™ environments.

In the present system, an additional update of the GUI is performed in parallel to the displacement of the dragged object 420. This parallel update will be described in relation to FIGS. 4B to 4F.

In a further act 305, the user selects the first object 420, in order to drag and drop it onto one of the possible recipients/targets, namely the second objects 431 to 436. This selection of act 305 will trigger the known drag and drop loop as well as the present drag and drop operation. The triggering may be caused by a user input of a specific type, like a longer touch input (i.e. a select and hold on panel input) using one of his fingers, or a maintained selection of the pointer using a mouse, as known in the Windows™ or Apple™ OS. In the here after description, user inputs will be described as touch inputs from the user. The man skilled in the art will easily transpose the present teachings to a mouse based selection.

With the touch input of the specific type, the electronic device 400 enters the drag and drop mode or loop. The user can actually see that the drag and drop is initiated as he moves his finger across the screen 400. Indeed, the GUI will be updated to match all additional drag inputs, and the first object 420 will appear to follow the finger, as in known drag and drop operations.

As seen in the illustration of FIG. 4A, the first object 420 presents a first size larger than the possible targets 431 to 436. Furthermore, the second objects are of the same size. In other words, they may be comprised in geometric elements from the GUI that present the same dimensions. Another aspect from this exemplary embodiment of FIG. 4A is the alignment of the target objects 431 to 436 along an axis 440 (defined as the median axis going through the center of the second objects). This allows the definition of an initial normal distance $D_N^{INIT}$ 445 between the first object 420 and the axis 440.

The normal distance, as all distances mentioned here after may be measured center of object to center of object, or edges to edges . . . , like in FIG. 4A where its measured lower edge (of first object 420) to center (of second objects, i.e. to the median line 440).

In the present method, the drag of the first object causes an altering of its size as it is dragged closer to second objects it may be dropped on. The altering, as detailed later on, is based on the second objects that are tagged as, i.e. deemed, potential drop targets.

A potential target, for a given position of the first object 420, is a second to object onto which the first object may be—or is likely to be—dropped, based on a projection or anticipation of its future displacements. In other words, potential targets, as explained here after, are based on predictive techniques that define second objects that are still within reach of the first, at a given position in time of the first object along its drag trajectory.

As seen on FIGS. 4B to 4F, the first object 420 shrinks till it reaches a size similar to the size of the potential targets.

In an additional, yet optional, embodiment of the present method, it may be interesting to delay the shrinking as long as the dragged first object has not been displaced by a preset or predetermined distance D.

This corresponds to subsequent acts 310 and 315. In a further act 310, the processor of the electronic device 400 will monitor an initial drag input received from the user following the drag and drop mode initiation. Using this initial drag input, the processor will determine in a further act 315 if the first object displacement (from its initial position) is still below the predetermined distance D (answer Yes to act 315). Provided so, it will left the first object size unchanged and monitor for further drag input (act 310 again). The sequence of acts 310 and 315 will be performed as long as the received drag inputs correspond to a displacement below D.

The displacement may be measured in different ways, like the total displacement of the dragged first object along the trajectory as defined by the drag inputs. Alternatively it may be a radial displacement, taking into account only displacement towards the second objects.

The predetermined distance will delay the subsequent size alteration (acts 320 and following) and may enable the user to see that he has initiated the drag and drop operation before the actual size alteration takes place.

Figure 4B:
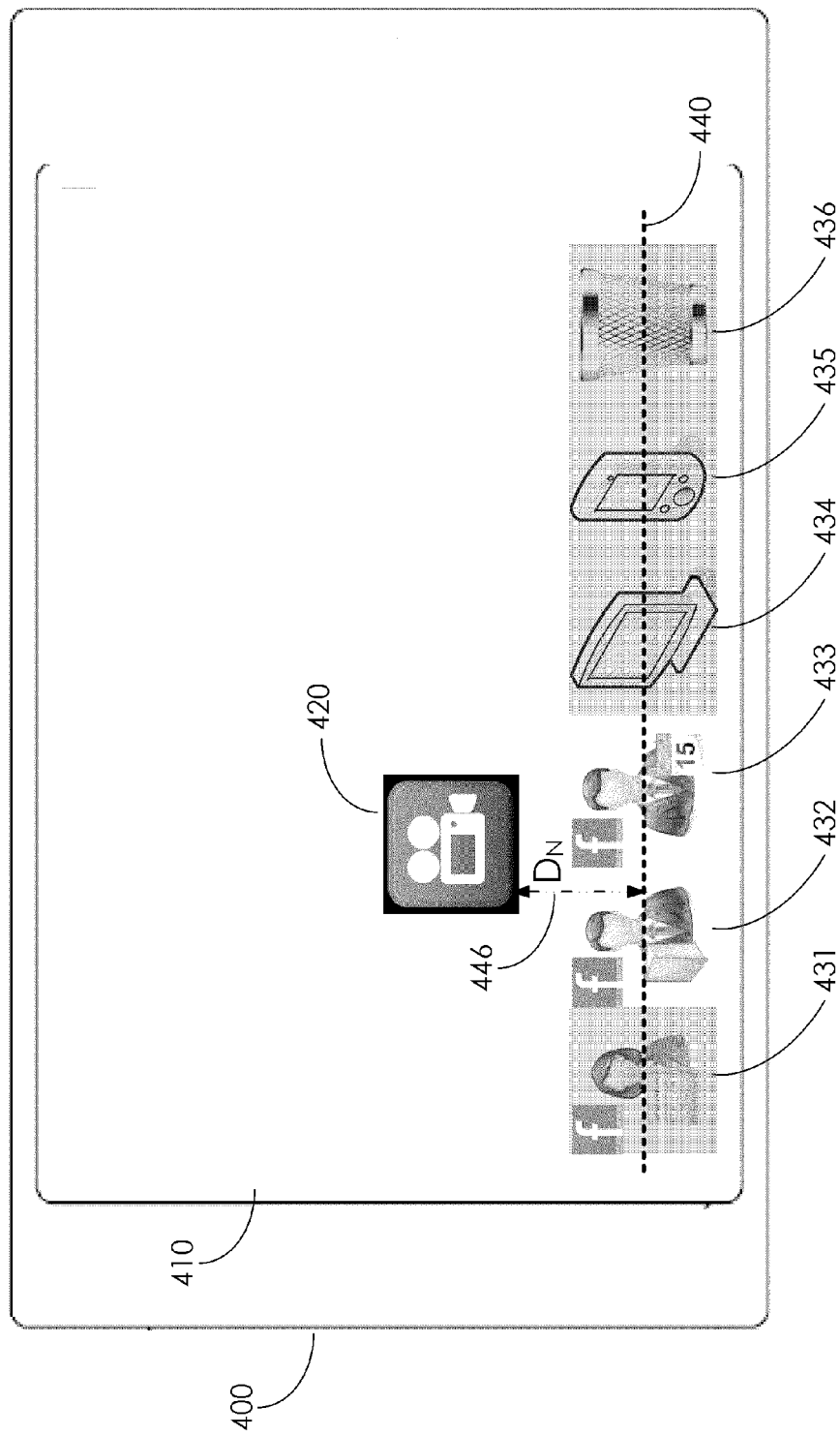
FIG. 4B shows an exemplary illustration of a GUI according to an additional embodiment of the present system.
Figure 4C:
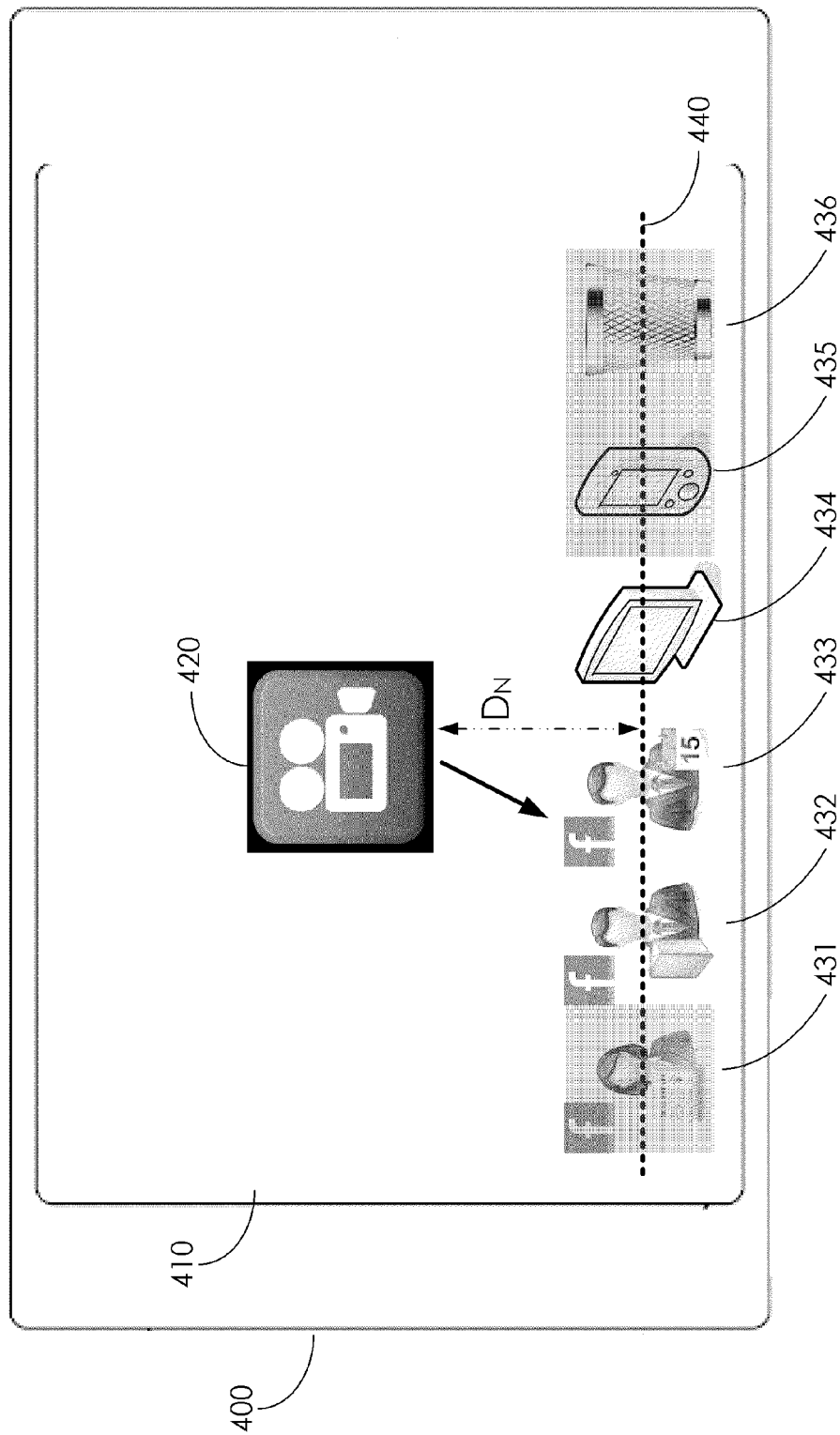
FIG. 4C shows an exemplary illustration of a GUI according to an additional embodiment of the present system.
Figure 4D:
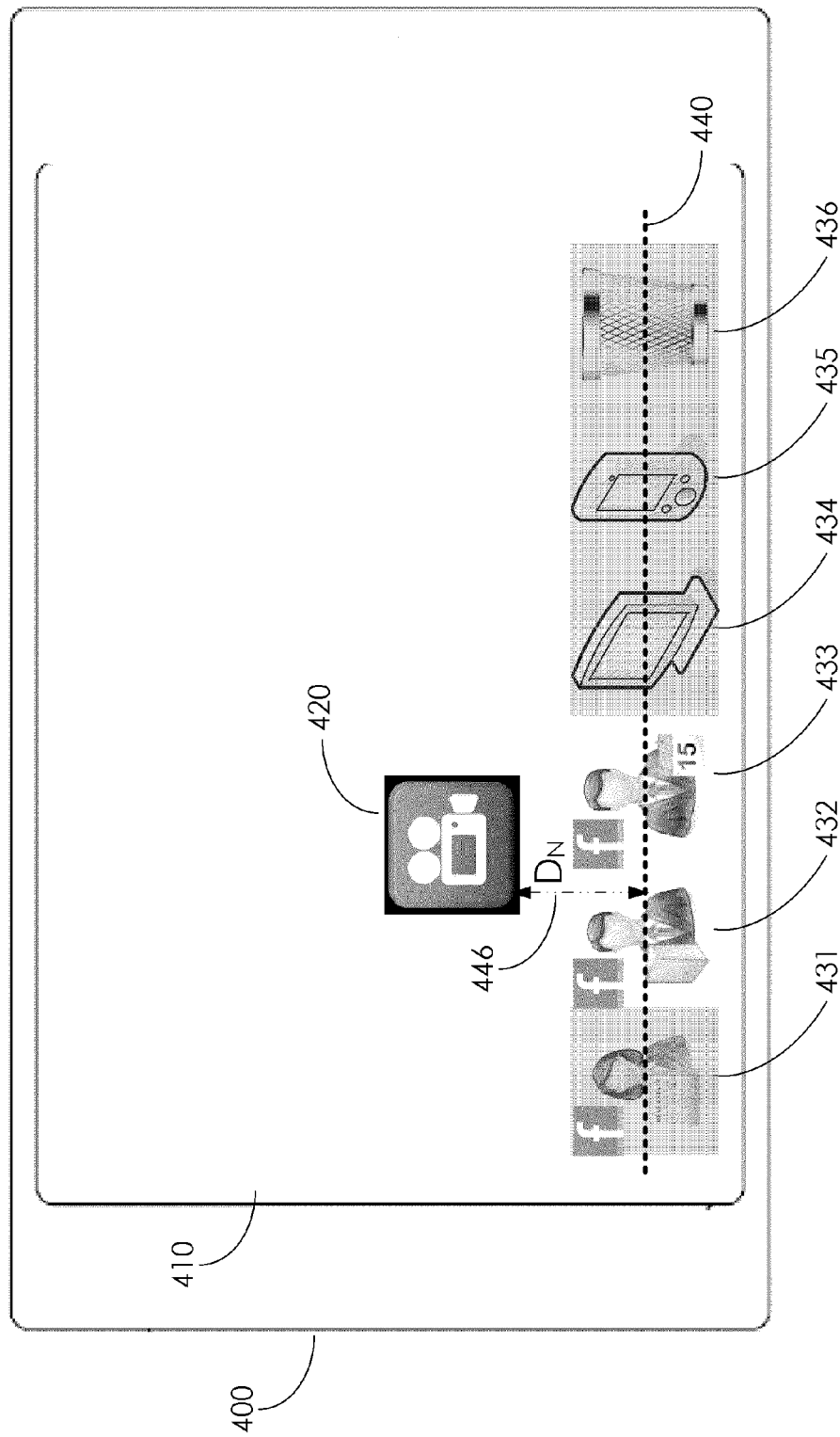
FIG. 4D shows an exemplary illustration of a GUI according to an additional embodiment of the present system.
Figure 4E:
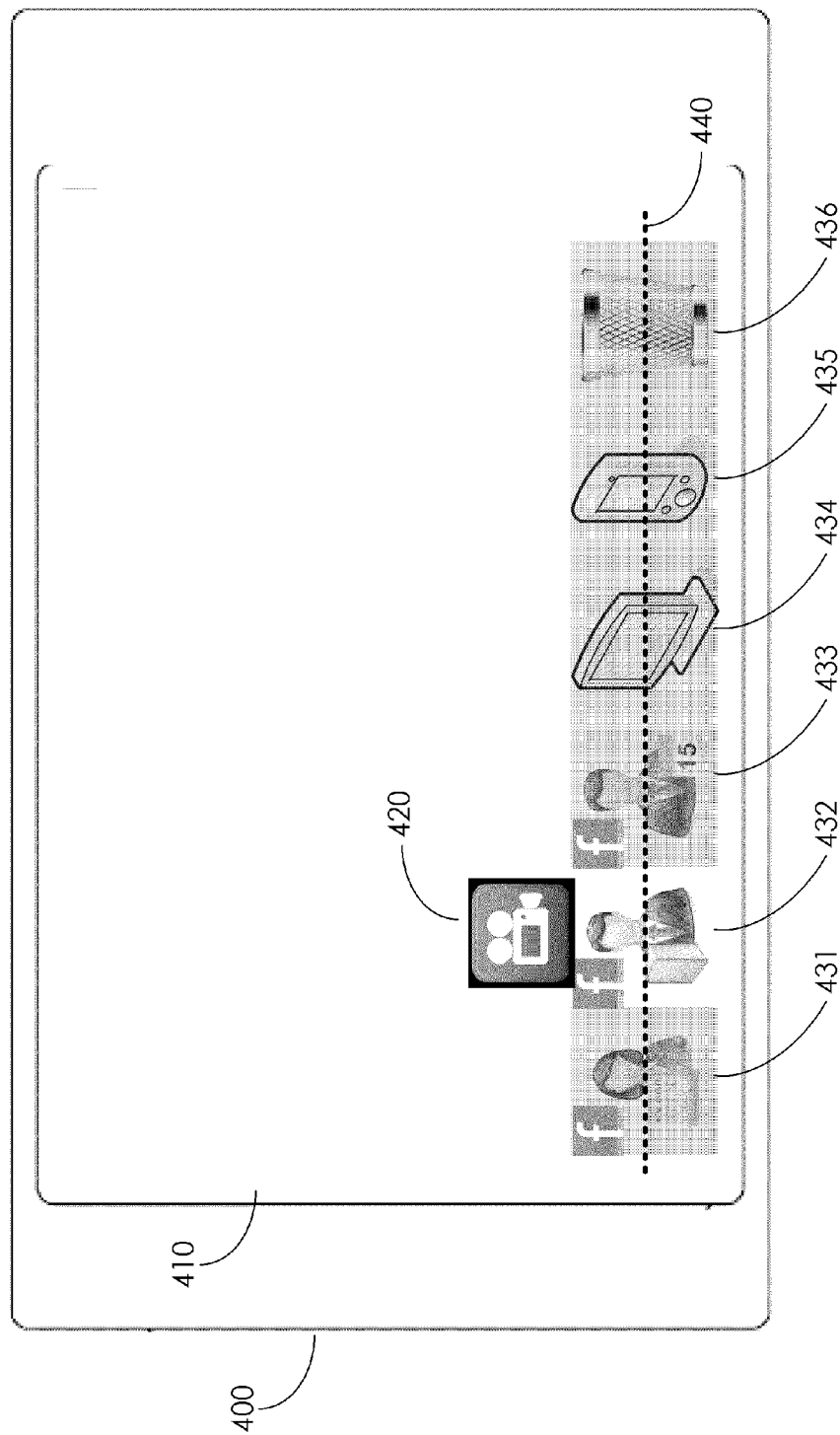
FIG. 4E shows an exemplary illustration of a GUI according to an additional embodiment of the present system.
Figure 4G:
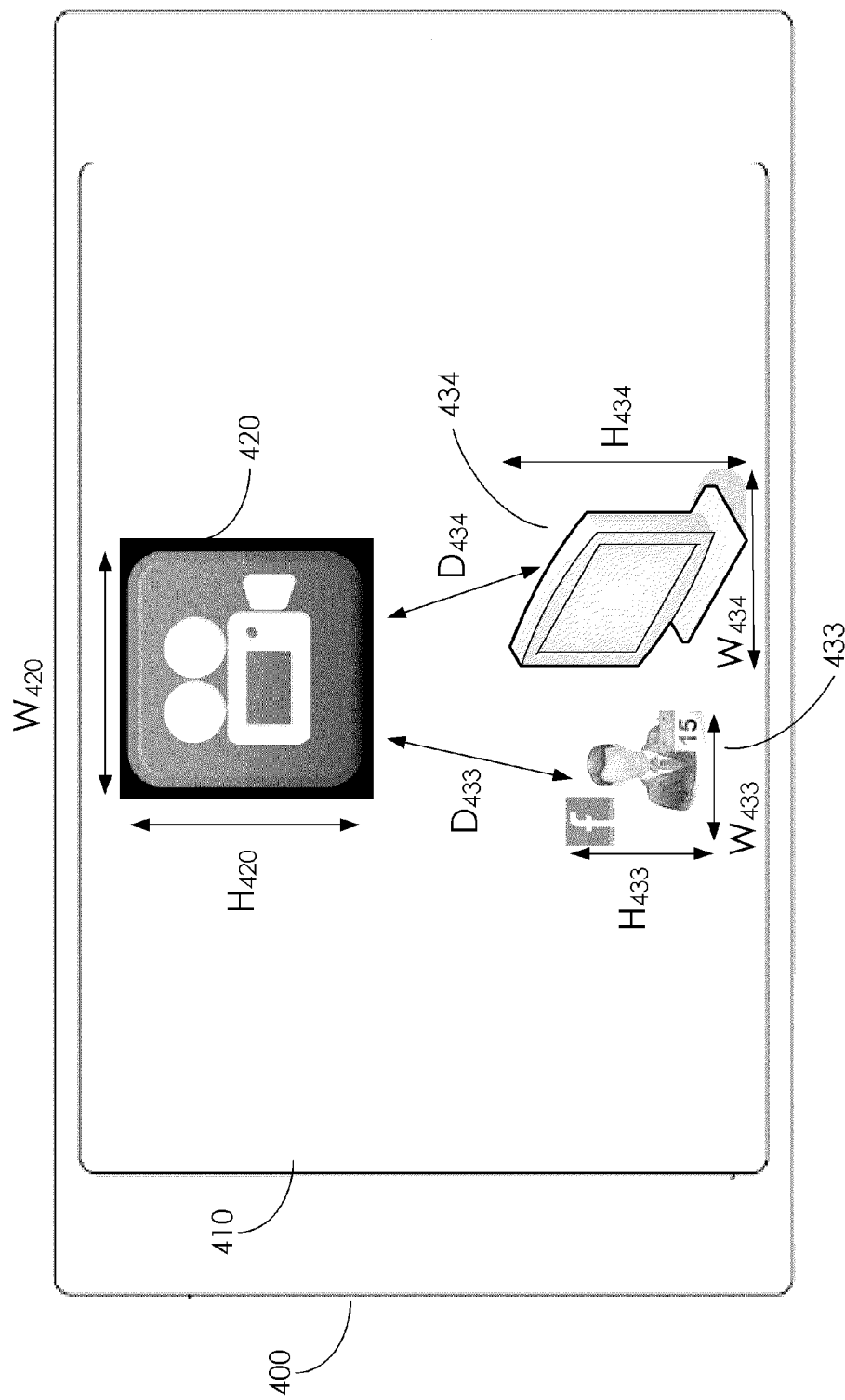
FIG. 4G shows an exemplary illustration of a GUI according to an additional embodiment of the present system.

FIG. 4B is an illustration of the optional delay in size alteration. Here the predetermined distance D is the normal distance $D_0$ 447 to the median axis 440. The distance is here measured normally in the direction of the axis 440. The remaining normal distance when the predetermined distance $D_0$ is covered is noted $D_N$ (reference 446).

Once the predetermined distance D is reached (answer N to act 315), in a subsequent act 320, the processor of the electronic device 400 will check if a further drag input (continuous with the previous one) is provided by the user (on the screen) on the first object 420. The drag input may be imparted in the direction 421 as illustrated in FIG. 4A.

The additional drag input enables the processor to determine the first object new position. In parallel to updating the GUI (to move the first object to its new position according to the additional drag input), the processor of the electronic device 400 will determine in a further act 330 one or more second objects onto which the dragged first object may be dropped. These second objects correspond to the potential targets for the drag as mentioned before, and their respective sizes will influence the size alteration of the first object. Different techniques are available to the man skilled in the art to determine or select these potential targets based at least on the received drag input of act 420. The techniques listed here after all use at least the updated first object position, as derived from the received drag input (in act 320).

Distance Based Techniques:

For each received additional drag input, the processor of the electronic device 400 will compute the first object updated position. Based on that new position, one possible simple technique may consist in computing the distance between the update first object A position and the second objects Bi positions. These distances are the actual distances to the second objects.

In order to determine the second objects that will influence the size alteration, the processor of the electronic device 400 may proceed as follows. Using the different distances ABi, a normalized distance di may be further calculated.

If A is the first object, and Bi one of n second objects,
If ABi the distance between Bi and A's updated position,
Let di be the normalized distance defined as:

$$di = \frac{ABi}{\min_{j=1}^{n}(ABj)}$$

As mentioned before, one may note that the distances may be measured from center of object to center of object, or edge to edge, or barycenter to barycenter, edges to center . . . .

The normalized distance for a second object may be seen as the ratio of its to distance to the first object over the smallest of all distances (from all second objects) to that first object 420. The smallest distance is reached for a second object referred to as Bj. The normalized distance allows to compare how much more distant the other object Bi are to the first object than the closest second object. A ratio α>1 may be defined to determine which objects are considered as close enough to the first object and which ones are not.

Provided di≤α the second object Bi will be considered close enough to the second object Bj closest to the first object A, consequently a potential target that will influence the size alteration, Provided di>α the second object Bi will be considered too far from the second object Bj, and consequently discarded from the subsequent size alteration, As the first object is still distant from the second objects (distance $D_N$ as seen in the illustration of FIG. 4B), the distribution of the normalized distance will present a concentration of values around 1 as for instance second objects 432, 433 and 434 are somewhat equidistant to the first object 420. As the first object gets closer and closer to second objects (example of FIG. 4C, second object 433 still being the closest one of the second objects), the outer most second objects will present normalized distances with large values, like greater than 2 or more. Less and less second objects will present normalized distances di close to 1. The potential targets will decrease in population while the remaining second objects will increase of the same. Using the examples of FIGS. 4B and 4C:

- in FIG. 4B, second object 433 is the closest one and $AB_{433}$ the smallest distance), $AB_{432} \approx AB_{434} = 1.25$, while the other distances like $AB_{431}$ are greater than 1.8. Provided a=1.4, the potential targets are second objects 432, 433, and 434. The non targets, or discarded second objects, will consist of second objects 431, 435, and 436, slightly faded in appearance in FIG. 4B, to facilitate the present discussion (not part of the actual GUI),
- in FIG. 4C, second object 433 is still the closest one, as the user is dragging the first object 420 towards this second object. $AB_{433}$ is consequently the smallest distance), $AB_{432}$ 1.25, while the other distances like $AB_{433}$ are greater than 1.45. Provided α=1.4 as before, the potential targets are second objects 432 and 433. The discarded second objects will consist of second objects 431, 434, 435, and 436, slightly faded again in appearance.

Direction Based Techniques:

Another approach to the potential target determination may consist in monitoring the direction 421 imparted to the dragged first object 420. Based on the successive first object positions, i.e. the received drag input in act 320, the processor of the electronic device 400 can determine the trajectory and direction of the first object 420. The history of the directions, using different predictive techniques available to the man skilled in the art, will allow the determination of a direction prediction.

The direction prediction may be associated to a cone of influence, defining the area that the dragged object is most likely to visit based on the direction prediction. Any second object falling into that cone will be considering as a potential target. Every second object falling out of the cone will be tagged as non potential target.

The cone of influence may be constructed around the direction prediction using an angle opening proportional the distance from the dragged object to the closest second object.

If A(t) is the first object at instant t, and Bi one of n second objects,

If A(t)Bi the distance between Bi and A's updated position,

If $A(t_0)$ is the first object initial position at the initiation of the drag,

If $A(t_0)$Bi the initial distance between Bi and A's initial position

Let α be the opening angle of the cone of influence defined as:

$$\alpha(t) = 90 * \frac{\min_{j=1}^n (A(t)Bi)}{\min_{j=1}^n (A(t_0)Bj)}$$

As the dragged object comes closer to the second objects, as seen in FIGS. 4B to 4E, the opening angle α will get lower and lower, hence giving the user the impression that less and less second objects are potential targets.

One may note that the here above examples were illustrated with linear functions. Non linear function may be used as well to give a sense to the user that the potential target determination is either done at the beginning of the drag motion or at the end, as his finger gets closer to the second objects.

Probabilistic Techniques:

More complex predictive techniques may be used to determine the potential targets among the second objects. For instance, a trajectory of the first object may be estimated through the history of its positions with more or less confidence. The level of confidence will define a region of the GUI defining the positions the dragged first object may reach within that level of confidence. The region will start narrow from the current first object position and open up as one goes closer to the second object of FIGS. 4A-4E. The second objects falling within that region will be considered as potential targets, while second objects falling outside the region will be discarded for the subsequent size alteration.

The different predictive techniques listed here before, as well as other predictive techniques, will use:

the updated position of the first object on the GUI, as derived from the received drag input, the position of the second objects on the GUI, optionally a drag direction, drag trajectory or drag pattern as inferred from the history of the received drag inputs and updated first object positions, to determine the projected displacements of the first objects from its current position (i.e. new or updated position) and select the second objects that are within reach of these projected displacement.

In a further act 340, the processor of the electronic device 400 will proceed with altering the size of the first object, based the respective sizes of the second objects selected as potential targets. The size alteration will allow the processor to calculate an updated first object size.

The idea behind the size alteration is to allow a size adaption of the first object as it is dragged closer and closer to one of the second objects. The size alteration may take into account different characteristics from the selected second objects, i.e. the ones deemed potential targets in act 330:

their respective dimensions, i.e. height and width, their respective distance to the first object current position.

A more generic GUI example is presented in FIG. 4G, wherein the first object 420, characterized with a first size (height $H_{420}$, width $W_{420}$) may be dragged onto on of the potential target 433 of a second size (height $H_{433}$, width $W_{433}$) or potential target 434 of a third size (height $H_{434}$, width $W_{434}$). The non targets have not been represented for simplification purposes.

In the present example, the second objects 433 and 434 are of different sizes. Yet they both still are potential targets using for instance one of the selection techniques illustrated here before.

Assuming there is only one target object, and a linear resizing approach, the resizing formula could be:

$$W(r) = W_0 + (W_F - W_0)\frac{r}{R_0}$$

wherein:
W(r): width of the first object, at a distance r from its initial position,
$W_0$: initial width of the first object,
$W_F$: final width of the first object, i.e. width of the target object if only one.
$R_0$: initial distance to the target object, when only one.

The resizing formula will get more complex when there is more than one potential targets. In an additional embodiment of the present method, the altering of the size will be based on the average size of the selected second objects. This embodiment is based on the assumption that the first object is dragged towards a fictitious target object that is:
distant from the first object by a distance which is the average distance between the first object and the potential targets,
of a size that is the average size of the target objects.

In the example of FIG. 4G, it may be interesting to only use the width as the resizing reference to allow the dropping of a shrunk first object with the same width as the final target object.

Using the precedent resizing formula, the elementary resizing becomes:

$$W(r + \partial r) = W(r) + \left(\frac{(W_{433} + W_{434})}{2} - W(r)\right)\frac{2\partial r}{(d_{433} + d_{434})}$$

wherein:
W(r): width of the first object, at a distance r from its initial position,
∂r the elementary displacement corresponding to the additional drag input of act 320 in FIG. 3A,
W(r+∂r): width of the first object, at a distance r+∂r from its initial position,
$d_{433}$ the distance from the first object current position to the potential target 433,
$d_{434}$ the distance from the first object current position to the potential target 434.

The width of the first object will be reduced of a ratio:

$R_W = W(r+\partial r)/W(r)$

The proposed formula only takes into account the current width of the first object, and the additional drag input. This is to account for the fact that the potential targets may change with each additional drag input.

The height of the first object may be then:
left unchanged if the focus is mostly on the width alteration,
updated using the same formula transposed to the heights of the different objects,
updated using the ratio $R_W$ so as to keep the width/height proportion of the first object.

A more complex resizing formula could be use to the contribution of each potential targets.

In an additional embodiment of the present method, the second objects are of an identical size, the altering of the first object size being a function of that identical size.

The resizing formula for the width becomes:

$$W(r + \partial r) = W(r) + (W - W(r))\frac{N\partial r}{(\sum d_i)}$$

wherein:
W(r): width of the first object, at a distance r from its initial position,
∂r the elementary displacement corresponding to the additional drag input of act 320 in FIG. 3A,
W(r+∂r): width of the first object, at a distance r+∂r from its initial position,
di the distance from the first object current position to the selected potential target i,
N the number of selected potential targets,
W the common or identical size for the second object.

In this simplified function, the average distance between the current position of the first object and the selected potential targets is taken into account.

In a further embodiment of the present method, the second objects are aligned along a media axis, as axis 440 shown in FIGS. 4A to 4E. The altering of the first object size can then be expressed as a function of the normal distance $D_N$ between the first object to that axis or line 440 formed by the second objects. The normal distance is illustrated in FIG. 4B at reference number 446.

The width resizing or size altering formula becomes again the simple function as if only one second object was present in the GUI:

$$W(r) = W_0 + (W_F - W_0)\frac{r}{R_0}$$

wherein:
r: distance from the first object current position to its initial position,
W(r): width of the first object, at a distance r from its initial position,
$W_0$: initial width of the first object,
$W_F$: final width of the first object, i.e. common width of the second object,
$R_0$: initial distance to the median axis.

As mentioned before, the height may be left unchanged, or updated using the different approaches listed here before (same formula or ratio $R_W$).

Other size altering functions may be used, like non linear functions, to emphasize the resizing either early (close to the initial position) or later on (closer to the second objects) the drag and drop operation. As a result of the size altering, the processor will obtain a new size for the first object. In a further act 345, the processor will update the GUI based on the received drag input and the first object altered size. As a result, the user will see a GUI with the first object at the updated position with the computed new size.

The drag and drop loop may carry on with each further drag input received from the user (answer Yes to act 320, following act 340), with the corresponding update of the first object displacements, and the resizing of act 340. When no more drag input are received (answer No to act 320), the method may end with returning the dragged first object to its initial position in a further act 350. This may be the case for instance when the user changes his mind and discontinue the drag and drop operation.

FIGS. 4C to 4F give additional exemplary GUIs of the present drag and drop operation. As the first object 420 is dragged closer and closer to one of the second objects, here potential targets 433, 434 and 435 in FIG. 4C, the first object shrinks further. Second objects 431, 435 and 436 are shaded to show they are discarded from subsequent size alteration.

With the particular embodiment of aligned second objects of the same size, as in exemplary GUIs of FIG. 4A to 4F, the selection or determination of the potential targets is limited to the retrieval of their common size. Indeed, as mentioned before, they are assumed to have all the same influence, which allows to only use the normal distance. The lateral component of the distance between the first object and any second object is not taken into account.

As the first object gets even closer to one of the second objects, here second object 432, its size, here its width shrinks down to a size compatible for dropping onto that second object. The drop is shown in FIG. 4F.

Thanks to the present method, the user can easily perform the drag and drop of a large first object onto one of many smaller second objects. Indeed, a main use case can be that, as the dragged object comes in proximity to the user intended target for a drop, the first object has been altered to a size similar to that of the intended target. The altering is based on the size of the potential targets respective sizes, potential targets as defined according to the projected displacements. This alteration will help the user to focus on an always smaller first object, thus simplifying the GUI and his drag and drop experience.

Going back to act 350 of FIG. 3A, it may be interesting to return the first object to its initial position and initial size if the user discontinues the drag and drop operation. To do so, in an additional embodiment of the present method, the size alteration (of act 340) will further comprise the storing of the first object updated current position in association with its altered size. The storing will be sequential so as to keep track of the first object history of positions.

Figure 3B:
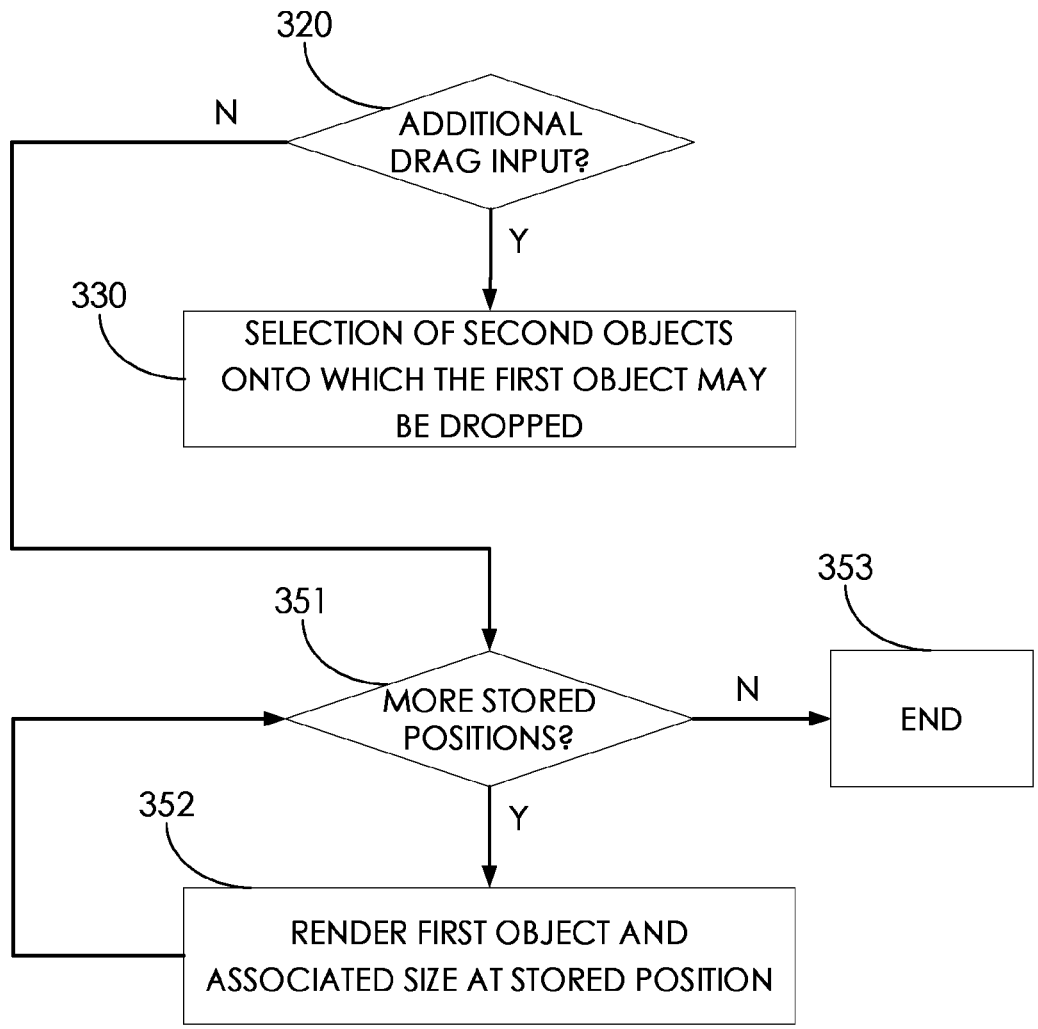
FIG. 3B is an exemplary flowchart showing the return of the dragged first object to its initial position.

FIG. 3B is an exemplary flowchart showing the return of the dragged first object to its initial position. Provided the processor detects a discontinuity in the received drag input (answer No to act 320) prior to any drop on a second object, the present method will carry on with a further act 351 to start rendering, in reversed sequential order, the first object on each of the stored previous positions using its associated altered size. The processor will thus display updated GUIs with the stored positions and sizes of the first object, as if replaying the drag operation backwards from the (most recent) discontinuity in the drag inputs to the (initial) triggering of the drag and drop operation.

The rendering of the successive past positions (act 352) will be carried on (answer Yes to act 351) until the first object reaches its initial position or there is no more stored previous positions (answer No to act 351). It will then end with an updated GUI showing the first object in its initial position with its initial size. Thanks to this additional embodiment of the present method, the user will retrieve the initial GUI prior to any attempt at a drag and drop operation.

In the here above description, and reference to FIG. 4, it was assumed that the plurality of second objects was aligned. This is in no way a limitation as the present teachings could benefit to second objects distributed around the GUI of the electronic device 400. It was further assumed that the size alteration of the first object was to accommodate exactly the size of the potential targets. The size alteration can of course be applied to a size proximate or similar to the size of the potential targets.

Finally, the above discussion is intended to be merely illustrative of the present system and should not be construed as limiting the appended claims to any particular embodiment or group of embodiments. Thus, while the present system has been described with reference to exemplary embodiments, including user interfaces, it should also be appreciated that numerous modifications and alternative embodiments may be devised by those having ordinary skill in the art without departing from the broader and intended spirit and scope of the present system as set forth in the claims that follow.

The section headings included herein are intended to facilitate a review but are not intended to limit the scope of the present system. Accordingly, the specification and drawings are to be regarded in an illustrative manner and are not intended to limit the scope of the appended claims.

In interpreting the appended claims, it should be understood that:

a) the word "comprising" does not exclude the presence of other elements or acts than those listed in a given claim;

b) the word "a" or an preceding an element does not exclude the presence of a plurality of such elements;

c) any reference signs in the claims do not limit their scope;

d) several "means" may be represented by the same item or hardware or software implemented structure or function;

e) any of the disclosed elements may be comprised of hardware portions (e.g., including discrete and integrated electronic circuitry), software portions (e.g., computer programming), and any combination thereof;

f) hardware portions may be comprised of one or both of analog and digital portions;

g) any of the disclosed devices or portions thereof may be combined together or separated into further portions unless specifically stated otherwise;

h) no specific sequence of acts or steps is intended to be required unless specifically indicated; and i) the term "plurality of" an element includes two or more of the claimed element, and does not imply any particular range of number of elements; that is, a plurality of elements may be as few as two elements, and may include an immeasurable number of elements.

What is claimed is:

1. A method for improving a drag and drop operation of a first object onto one of a plurality of second objects in a graphical user interface (GUI) presented on a display device, the method comprising:

receiving a single drag operation on the first object, the single drag operation comprising a selection of the first object, a plurality of drag inputs, and a release of the first object, each drag input having a displacement, the single drag operation received through the display device;

in parallel with receiving each drag input:
predicting future displacements of the first object using the received drag input;
determining a current set of one or more potential second objects onto which the first object is likely to be dropped based on the predicted future displacements;
determining a cumulative displacement comprising all previous displacements;
determining a new position of the first object based on the displacement of the received drag input;
when the cumulative displacement exceeds a predefined minimum displacement, the minimum displacement enabling the user to visually confirm the single drag operation, determining a new size for display of the first object based on the respective sizes of each object in the determined current set of potential second objects and altering the size of the first object based on the determined new size; and updating the GUI on the display device based on the received drag input, the updating including redrawing the first object at the new position; and when the single drag operation is terminated, updating the GUI on the display device to reflect the termination.

2. The method according to claim 1, wherein when the current set of one or more potential second objects comprises a plurality of potential second objects and the current set of one or more potential second objects are of an identical size, the act of determining a new size comprises retrieving this identical size, and the act of altering the size of the first object is a function of this identical size.

3. The method according to claim 2, wherein the current set of potential second objects are aligned in the GUI, the act of altering the size being a further function of the normal distance between the first object and a line formed by the current set of potential second objects.

4. The method according to claim 1, wherein:

altering the size of the first object is a function of the average size of the determined current set of one or more potential second objects.

5. The method according to claim 1, wherein the acts in parallel with receiving each drag input further comprise:

leaving the size of the first object unchanged as long as the cumulative displacement is below the predefined minimum displacement.

6. The method according to claim 1, further comprising:

detecting a discontinuity in the plurality of drag inputs received on the first object prior to a release of the first object, and returning the first object to its initial position relative to the single drag operation.

7. The method according to claim 6, the act of altering the size of the first object further comprising storing sequentially the first object new position in association with its new size in a computer-readable memory, the act of returning the first object to its initial position comprising:

rendering, in reversed sequential order, the first object on each of the stored previous positions using its associated new size, until the first object reaches its initial position.

8. The method of claim 1, wherein altering the size of the first object comprises:

shrinking the size of the first object as the first object is dragged closer to the current set of one or more potential second objects.

9. The method of claim 8, wherein shrinking comprises:

shrinking the size of the first object until first object is in proximity with a particular one of the current set of one or more potential second objects and at which the new size of the first object is similar to the size of the particular second object.

10. An electronic device comprising:

a display device for rendering a graphical user interface (GUI) comprising a first object and a plurality of second objects, a processor configured to improve a drag and drop operation of the first object onto one of the plurality of second objects in the GUI rendered on the display device, the processor being further configured to:

receive a single drag operation on the first object, the single drag operation comprising a selection of the first object, a plurality of drag inputs, and a release of the first object, each drag input having a displacement, the single drag operation received through the display device;

in parallel with receiving each drag input:

predict future displacements of the first object using the received drag input;

determine a current set of one or more potential second objects onto which the first object is likely to be dropped based on the predicted future displacements;

determine a cumulative displacement comprising all previous displacements;

determine a new position of the first object based on the displacement of the received drag input;

when the cumulative displacement exceeds a predefined minimum displacement, the minimum displacement enabling the user to visually confirm the single drag operation, determine a new size for display of the first object based on the respective sizes of each object in the determined current set of potential second objects and alter the size of the first object based on the determined new size; and update the GUI on the display device based on the received drag input, the update including redrawing the first object at the new position; and when the single drag operation is terminated, update the GUI on the display device to reflect the termination.

11. A non-transitory computer readable medium comprising an application program stored thereon and executable by a processor in the form of a software agent including at least one software module comprising instructions that configure the processor to implement a method of for improving a drag and drop operation of a first object onto one of a plurality of second objects in a graphical user interface (GUI), the instructions comprising:

instructions that configure the processor to receive a single drag operation on the first object, the single drag operation comprising a selection of the first object, a plurality of drag inputs, and a release of the first object, each drag input having a displacement, the single drag operation received through a display device;

instructions that configure the processor to, in parallel with receiving each drag input:

predict future displacements of the first object using the received drag input;

determine a current set of one or more potential second objects onto which the first object is likely to be dropped based on the predicted future displacements;

determine a cumulative displacement comprising all previous displacements;

determine a new position of the first object based on the displacement of the received drag input;

when the cumulative displacement exceeds a predefined minimum displacement, the minimum displacement enabling the user to visually confirm the single drag operation, determine a new size for display of the first object based on the respective sizes of each object in the determined current set of potential second objects and alter the size of the first object based on the determined new size; and update the GUI on the display device based on the received drag input, the update including redrawing the first object at the new position; and instructions that configure the processor to, when the single drag operation is terminated, update the GUI on the display device to reflect the termination.

* * * * *

UNITED STATES PATENT AND TRADEMARK OFFICE
CERTIFICATE OF CORRECTION

PATENT NO. : 9,489,118 B2  
APPLICATION NO. : 13/729612  
DATED : November 8, 2016  
INVENTOR(S) : Alain Saas and Hyacinthe Briand Page 1 of 1

It is certified that error appears in the above-identified patent and that said Letters Patent is hereby corrected as shown below:

In the Claims

Claim 11: Column 16, Line 38, delete "of for improving" and insert --for improving--

Signed and Sealed this
Nineteenth Day of September, 2017

Joseph Matal
*Performing the Functions and Duties of the*
*Under Secretary of Commerce for Intellectual Property and*
*Director of the United States Patent and Trademark Office*